United States Patent [19]

Plunkett

[11] 4,377,779

[45] Mar. 22, 1983

[54] PULSE WIDTH MODULATED INVERTER MACHINE DRIVE

[75] Inventor: Allan B. Plunkett, Scotia, N.Y.

[73] Assignee: General Electric Company, Schenectady, N.Y.

[21] Appl. No.: 220,553

[22] Filed: Dec. 29, 1980

[51] Int. Cl.[3] ............................................. H02P 5/40
[52] U.S. Cl. .................................. 318/811; 318/802; 363/41
[58] Field of Search .................. 363/41; 318/723, 800, 318/801, 802, 803, 807, 810, 811

[56] References Cited

U.S. PATENT DOCUMENTS

| | | | |
|---|---|---|---|
| 3,819,992 | 6/1974 | Opal et al. | 318/811 X |
| 4,047,083 | 9/1977 | Plunkett | 318/231 |
| 4,295,189 | 10/1981 | Boys | 363/41 |
| 4,320,331 | 3/1982 | Plunkett | 318/723 X |
| 4,333,042 | 6/1982 | Kawada et al. | 318/801 X |

OTHER PUBLICATIONS

"Direct Flux and Torque Regulation in a PWM Inverter-Induction Motor Drive", A. B. Plunkett; IEEE Industry Applications, vol. 1A-13, No. 2; 4/77, pp. 139-146.

G. B. Kliman & A. B. Plunkett, "Development of a Modulation Strategy for a PWM Inverter Drive", IAS '75 ANNUAL.

Primary Examiner—J. V. Truhe
Assistant Examiner—Richard M. Moose
Attorney, Agent, or Firm—William H. Steinberg; James C. Davis, Jr.; Marvin Snyder

[57] ABSTRACT

Improved operation of a pulse width modulated inverter machine drive system is obtained by a control apparatus which regulates inverter switching device conduction by modifying switching signal waveforms transmitted to the inverter to eliminate switching pulses narrower than the minimum inverter switching device pulse width. By dropping the narrow inverter switching pulses in sequence during the exact interval which the pulses would otherwise occur and boosting the amplitude of remaining pulses, the control apparatus permits the inverter to smoothly transition from pulse width modulation operation to square wave operation without objectionable jumps in inverter output voltage.

6 Claims, 8 Drawing Figures

FIG. 4 (Pulse Drop Circuit 44)

TABLE I

| COMPARATOR OUTPUT SIGNAL AMPLITUDE | | | X | Y | AMPLITUDE BOOST SIGNAL |
|---|---|---|---|---|---|
| 110a | 110b | 110c | | | |
| 0 | 0 | 0 | 0 | 0 | 0 |
| 1 | 0 | 0 | 0 | 1 | 1 |
| 1 | 1 | 0 | 1 | 0 | 2 |
| 1 | 1 | 1 | 1 | 1 | 0 |

PULSE WIDTH MODULATED INVERTER MACHINE DRIVE

BACKGROUND OF INVENTION

This invention relates generally to inverter-machine drive systems, and more specifically, to a control apparatus for an inverter-machine drive system.

In various industrial applications, it is desirable to vary the speed and torque of a polyphase alternating current machine in response to operator commands. Since alternating current machine speed and torque are dependent on the frequency and amplitude, respectively, of machine stator current, control of machine speeds and torque can be achieved by conditioning, that is to say, varying the frequency and amplitude, respectively, of machine stator current.

Commonly, conditioning of the current supplied to the alternating current machine is accomplished by energizing the machine from an inverter coupled to a source of variable potential, usually a phase controlled rectifier. Technically, the inverter is configured of a plurality of pairs of serially coupled switching devices, corresponding in number to the number of machine phases, with each pair of switching devices coupled across the phase controlled rectifier output and coupled to the junction between switching devices to a respective machine phase. The inverter switching devices, each comprised of either a high current transistor or a thyristor, are rendered conductive in a predetermined sequence to supply the machine with alternating current of varying frequency and amplitude.

Various methods presently exist for controlling inverter switching device conduction to condition inverter output voltage. The most common method and perhaps the most effective, is that of pulse width modulation whereby each of the switching devices of each pair are rendered conductive more than twice during each inverter output voltage cycle, with the switching devices of each pair being rendered conductive in sequence. Rendering of the inverter switching devices conductive in the manner described above results in each phase component of inverter output voltage being comprised of a series of positive and negative pulses. By varying the frequency of switching device conduction, the number of pulses, and hence the frequency of inverter output current, can be varied accordingly. The pulse width or pulse duration, and hence the amplitude of inverter output voltage, is controlled by varying the inverter switching device conduction duration.

Pulse width modulated inverter operation is commonly accomplished by the triangle interception technique. Each of n sine waves, where n is the number of inverter switching device pairs with the sine wave varying jointly in frequency and amplitude in accordance with operator commands and each sine wave being displaced from another by 360°/n, is compared against a triangle waveform of fixed amplitude and frequency, the triangle waveform frequency being typically a minimum of 6 or 9 times greater than the sine wave frequency. During the interval when each sine wave is of an amplitude greater than the triangle waveform amplitude, one of the switching devices of each respective pair of inverter switching devices is rendered conductive. Conversely, during the interval when each sine wave is of an amplitude less than the triangle waveform amplitude, the other switching device of each respective pair of switching devices is rendered conductive. Control of inverter switching device conduction in this manner assures that the fundamental frequency of each phase component of inverter output voltage is approximately the same frequency as the sine wave frequency. By varying the sine wave amplitude, the inverter modulation index, that is, the ratio of the sine wave amplitude and the triangle wave amplitude, and hence the inverter output voltage amplitude, can be varied accordingly. If the chopping ratio, that is, the frequency ratio of the triangle waveform to the sine waveform is maintained greater than 6:1, harmonics in the inverter output voltage waveform will be of a relatively high order so that inverter voltage waveform will be relatively free of harmonic distortion.

While pulse width modulated inverter operation is desirable at low inverter output voltage levels and low machine speeds, to obtain maximum inverter output voltage and maximum machine speed, inverter square wave operation is required wherein each inverter switching device is rendered conductive only once during each cycle for a duration of 360°/n. For a three phase inverter, operating in square wave mode, the inverter output voltage waveform appears as a six step square wave whose appearance should be familiar to those skilled in the art. Although inverter harmonic voltage content is greater during square wave operation than during operation in the pulse width modulated mode, the machine load and the machine rotor itself provides sufficient inertia to smooth out any pulsations at the relatively high speed of this operating condition.

One of the difficulties incurred in pulse width modulated inverter machine drive systems is their inability to smoothly transition from pulse width modulation operation to square wave operation. During operation in the pulse width modulation mode, when the sine wave amplitude is increased to increase machine amplitude, it is inevitable that during certain intervals, when the sine wave intercepts the triangle wave, the switching pulse width, that is, the time interval during which the sine wave amplitude exceeds the triangle waveform amplitude, will become smaller than the minimum time required to commutate the then conductive inverter switching device and to render the incoming switching device conductive. To avoid the undesirable effects of too narrow inverter switching pulses, it is desirable to simply drop them. However, if such switching pulses are just dropped, due to the minimum width of these pulses, the inverter output voltage increases sharply, causing appreciable jumps in motor torque. One apparatus for controlling an inverter machine drive system for accomplishing smooth inverter transition from pulse width modulation operation to square wave operation is described in my U.S. Pat. No. 4,047,083 issued on Sept. 6, 1977 and assigned to the General Electric Company. The control apparatus of my previous patent implements pulse width modulation operation during intervals of low machine speed by supplying the inverter with switching pulses produced in accordance with the conventional triangulation technique. At high machine speeds, the control apparatus supplies switching pulses to the inverter which are generated in accordance with a dual direct current level set scheme with the lower level varied in accordance with a higher level, whose magnitude is varied in accordance with an operator commanded amplitude signal. While a control apparatus described and claimed in my previous patent allows the inverter to smoothly transition from pulse width modulation operation to square wave operation its complexity makes it difficult to implement.

In contrast, the present invention concerns a low complexity control apparatus for a pulse width modulated inverter-machine drive system which accomplishes smooth inverter transition from pulse width modulation operation to square wave operation.

It is an object of the present invention to provide a low complexity control apparatus for a pulse width modulated inverter-machine drive system which implements pulse width modulation inverter operation during intervals of low machine frequency, square wave operation during intervals of high machine frequency and which implements smooth transitioning from pulse width modulation to square wave inverter operation.

It is a further object of the present invention to provide a control apparatus for a pulse width modulated inverter-machine drive system which accomplishes smooth transitioning from pulse width modulation to square wave inverter operation without objectionable jumps in machine voltage or high inverter voltage harmonic content.

BRIEF SUMMARY OF THE INVENTION

Briefly, in accordance with the preferred embodiment of the invention, an improved control apparatus for use with an inverter-machine drive system for supplying switching signals to the inverter to regulate inverter switching device conduction and hence, machine torque and speed, comprises first and second signal generators. The first signal generator produces four output signals: an n phase sine waveform signal, an n phase square waveform signal, a first reference signal which is a predetermined multiple of n times the frequency of the n phase sine wave signal and a second reference signal which is also a predetermined multiple of n times the frequency of the n phase sine wave signal and lags the first reference signal by 90°. The first signal generator is responsive to the operator-varied amplitude command signal and in response thereto, varies the amplitude of the n phase sine waveform signal. In response to an operator-varied frequency command signal, the first signal generator varies the frequency of both the n phase square waveform signal and the n phase sinusoidal waveform signal accordingly. The second signal generator produces a phase locked triangle waveform signal. A synchronizer circuit is coupled to both the first and second signal generator to assure that each of the triangle waveform signals is in phase with the n phase sine waveform signal and that each is a predetermined multiple of three times the frequency of the sine waveform signal. Coupled at a first input to the first signal generator are n comparators each supplying a respective phase component of the n phase sine waveform signal. The second input of each of the n comparators is coupled to a second signal generator means so as to receive therefrom the triangle waveform signal. Each of the n comparators produces an output signal pulse at a first logical level during intervals when the input signal magnitude of the first comparator input exceeds the input signal magnitude at the second comparator input and at a second logical level during intervals when the input signal magnitude at the first comparator input is less than the input signal magnitude at the second comparator input. The output signal pulses produced by each of the n comparators, together with the n phase square wave signal produced by the first signal generator and the second reference signal produced by the first signal generator are supplied to a pulse drop circuit which modifies the output signal pulses produced by each of the n comparators to delete in sequence comparator output signal pulses narrower than a predetermined duration, by preventing the output of said n comparators from being allowed through said pulse drop circuit during a preset interval of the first signal generator second reference signal. The pulse drop circuit also couples said n phase square wave signals to said inverter when all said output signal pulses produced by said n comparators are narrower than the predetermined duration. By modifying the comparator output signal pulses to delete in sequence comparator output signal pulses narrower than a predetermined duration during a preset interval of the second reference signal, the pulse drop circuit allows the inverter to smoothly transition from pulse width modulation operation to square wave operation. In addition, a signal is coupled to modify the sine wave generator amplitude to compensate the widths of the remaining pulses for the missing one thus rendering the machine voltage amplitude constant.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE PREFERRED EMBODIMENT

Figure 1:
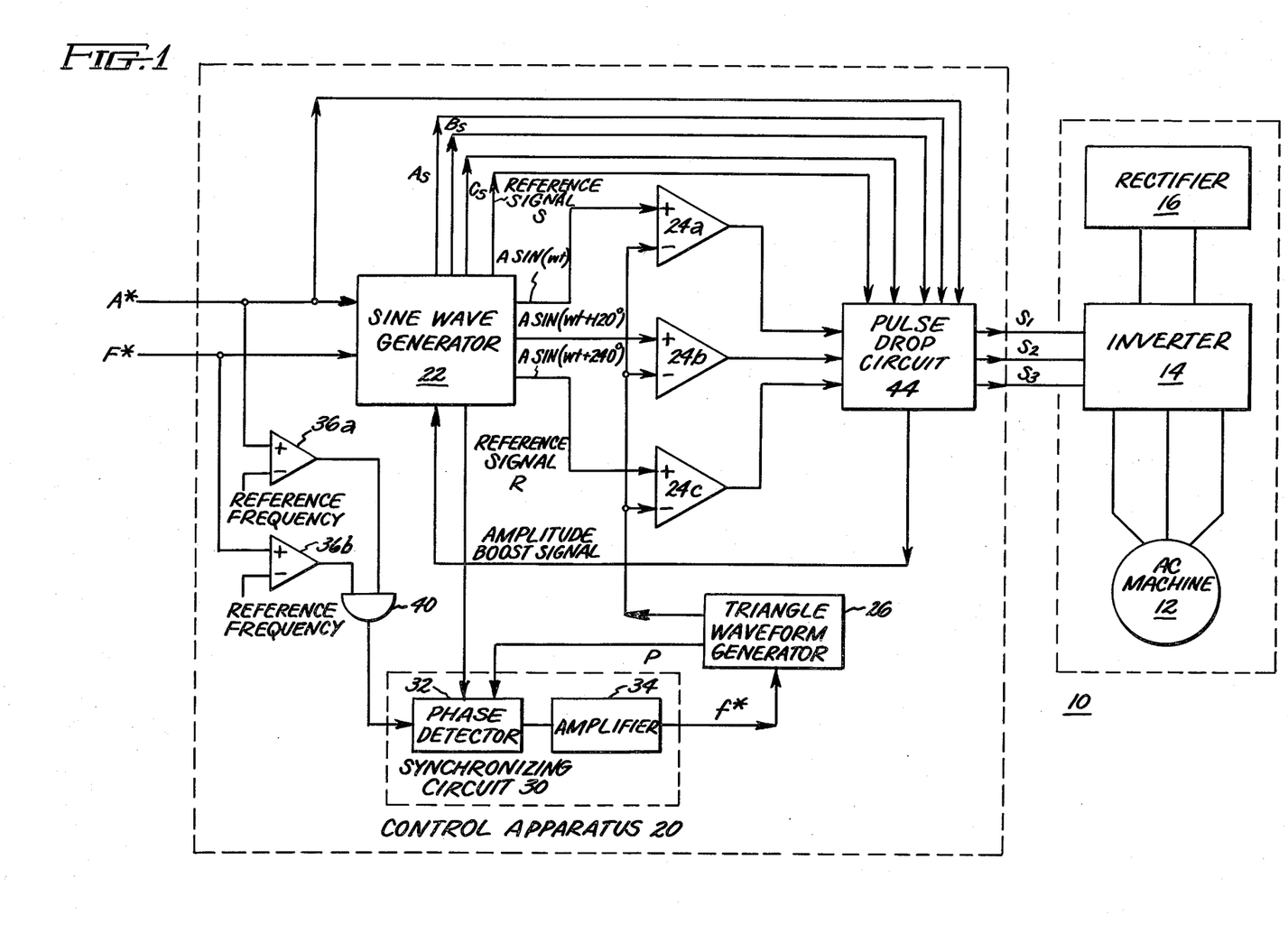
FIG. 1 is a block diagram of the control circuit of the present invention coupled to an inverter induction machine drive system.

FIG. 1 illustrates a pulse width modulated inverter drive system 10 comprised of an alternating current machine 12 which is supplied with variable frequency, variable amplitude, alternating current from an inverter 14 that is provided with DC from a DC source 16, typically comprised of a diode rectifier. The structure of inverter 14 is dependent on the nature of machine 12. Where, as in the presently preferred embodiment, machine 12 is configured of a three phase machine, inverter 12 comprises a three phase bridge inverter and comprises three pairs of inverter switching devices (not shown) each pair coupled across the output of diode rectifier 16 and coupled at the junction between switching devices to a separate one of the three phases of machine 12, respectively.

The duration and conduction sequence of inverter switching devices is regulated by the inverter, responsive to switching signals $S_1$, $S_2$ and $S_3$ supplied to inverter 14 by a control apparatus 20. Control apparatus comprises a sine wave generator 22 (described in greater detail with respect to FIG. 2) which produces a three phase square wave signal, the phase components of which are designated $A_s$, $B_s$ and $C_s$, respectively, and a three phase sine wave signal, the phase components of which are designated $A \sin (\omega t)$, $A \sin (\omega t + 120°)$ and $A \sin (\omega t + 240°)$, respectively. The frequency of the three phase square wave and three phase sine wave signals vary in accordance with an operator-varied frequency command signal F* while only the amplitude of three wave sine wave signal varies in accordance with an operator-varied amplitude command signal A*. In addition to producing a three phase square wave signal and a three phase sine wave signal, sine wave generator 22 also produces a first and second square wave reference signals, R and S, respectively, each reference signal being at a frequency either 6 or 9 times greater than the frequency of the square wave and sine wave signals.

Each of the three phase components of the sine wave generator sine wave signal is supplied to the noninverting input of a separate one of comparators 24a, 24b and 24c, respectively. The inverting input of each comparator is supplied with a fixed amplitude triangle waveform signal produced by a triangle waveform generator 26 (described in greater detail hereinbelow with respect to FIG. 3). Triangle waveform signal produced by triangle waveform generator 26 varies in frequency responsive to frequency synchronizing signal f* supplied from a synchronizer circuit 30 in accordance with the difference in phase between reference signal R of sine wave generator 22 and the feedback signal P of triangle waveform generator 26. Feedback signal P varies in amplitude in accordance with the phase of the triangle waveform generator output signal. By varying the amplitude of frequency command signal f* in accordance with the difference in phase between the triangle waveform generator output signal and the sine wave generator reference signal R, synchronizing circuit 30 assures that triangle waveform signal is synchronized to the sine wave signal produced by sine wave generator 22.

In the presently preferred embodiment, synchronizing circuit 30 comprises a phase detector 32 supplied at the first and second inputs with reference signal R from sine wave generator 22 and phase output signal P from triangle waveform generator 26, respectively. In accordance with the difference in phase between signals supplied to its first and second inputs, phase detector 32 supplies an output signal to an amplifier 34 configured with relatively high gain which, in accordance with the phase detector output signal provides triangle waveform generator 26 with a frequency control signal f*.

While it is generally desirable to synchronize the triangle waveform signal produced by triangle waveform generator 26 with a three phase sine wave signal produced by waveform generator 22, it is not useful to synchronize these signals during intervals when the amplitude command signal A* and the frequency command signal F* supplied to sine wave generator 22 are below a reference amplitude and a reference frequency value, respectively. Not synchronizing these signals reduces harmonics at low frequencies. To avoid synchronizing the sine wave generator sine wave signal with the triangle waveform generator triangle signal during intervals when signals A* and F* are each below desired limits, a pair of comparators 36a and 36b, respectively, are supplied at their respective inverting inputs with a fixed level signal representing a reference amplitude and a reference frequency, respectively. Comparators 36a and 36b are supplied at their respective noninverting inputs with a separate one of signals A* and F*, respectively. Each of comparators 36a and 36b is coupled at its output to a separate one of the two inputs of an AND gate 40, and when the input signal magnitude at the noninverting input of each comparator exceeds the comparator invert input signal magnitude, AND gate 40 supplies phase detector 32 with a signal at a first logical level, thereby rendering phase detector 32 operative to allow synchronizing circuit 30 to synchronize the sinewave and triangle wave signals. During intervals when amplitude command signal A* or frequency command signal F* is smaller in magnitude than the reference amplitude or reference frequency, respectively, the output signal supplied from AND gate 40 to phase detector 32 is at a second logical level, rendering the phase detector inoperative, thereby preventing synchronization of the sine wave and triangle wave signals.

Figure 4:
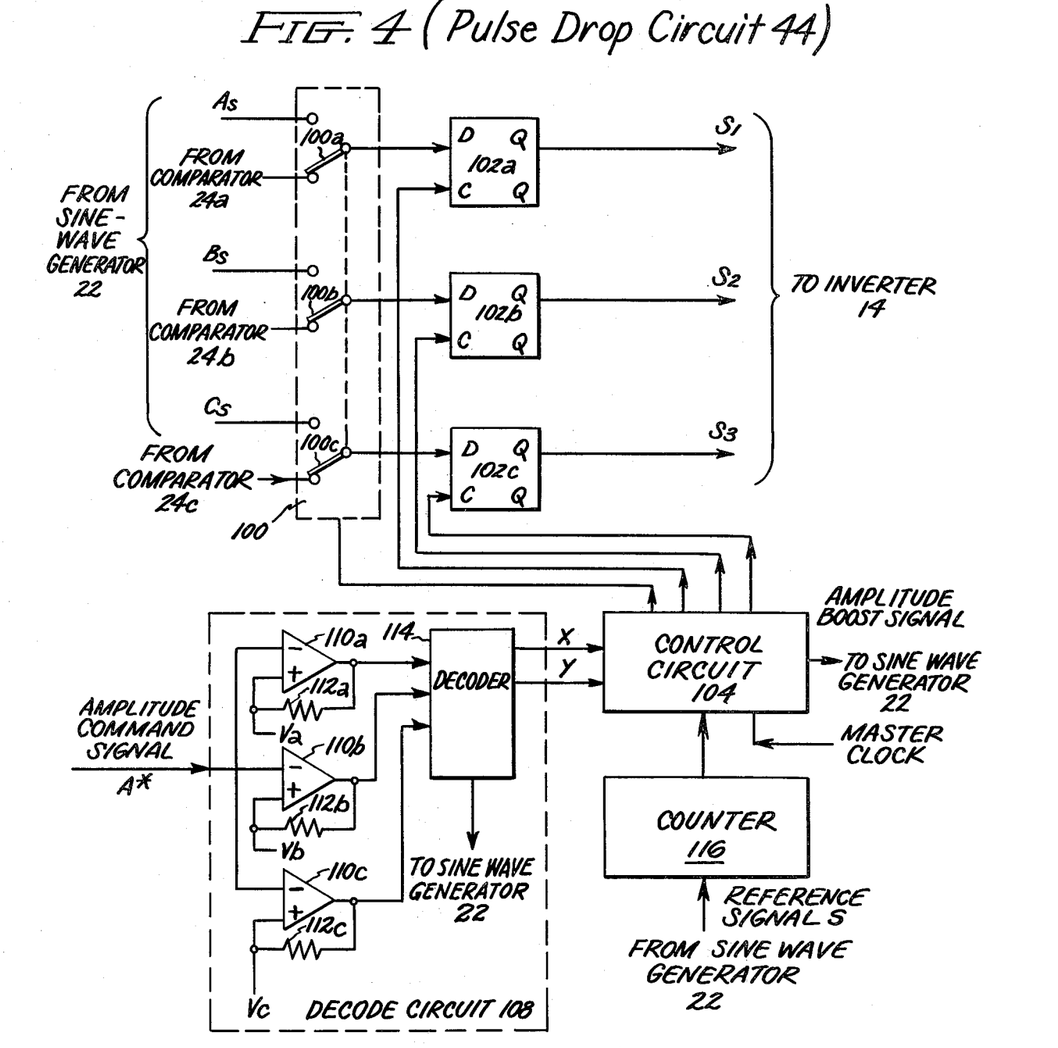
FIG. 4 is a block diagram of the pulse drop circuit of the present invention.

Each of comparators 24a, 24b, and 24c, when supplied at the noninverting input from triangle waveform generator 26 with a triangle wave signal, and the noninvert input from sine wave generator 22 with a respective one of the three phase components of the sine wave signal, provides an output signal which changes in amplitude between a first and a second logical level in accordance with the difference in amplitude between signals at its respective noninverting and inverting inputs to a pulse drop circuit 44 (described in greater detail hereinafter with respect to FIG. 4). Pulse drop circuit 44 is also supplied with three phase components $A_s$, $B_s$ and $C_s$ of the sine wave generator square wave signal, together with reference signal S and amplitude command signal A* and during intervals of low machine frequency, pulse drop circuit 44 supplies inverter 14 with switching signals $S_1$, $S_2$, and $S_3$ in accordance with the output signals produced by a separate one of comparators 24a, 24b and 24c, respectively, to accomplish pulse width modulation inverter operation. At high machine frequencies, pulse drop circuit 44 supplies inverter 14 with switching signals $S_1$, $S_2$ and $S_3$ in accordance with a separate one of the sinewave generator square wave signal phase components $A_s$, $B_s$ and $C_s$, respectively. To achieve smooth transitioning between pulse width modulation and square wave inverter operation, pulse drop circuit 44 supplies the inverter with switching signals $S_1$, $S_2$ and $S_3$ that are produced in accordance with the output signal of a separate one of comparators 24a, 24b and 24c, respectively, and modified by the pulse drop circuit to eliminate those switching pulses narrower than a predetermined interval to assure no objectionable jumps in inverter output voltage.

Figure 2:
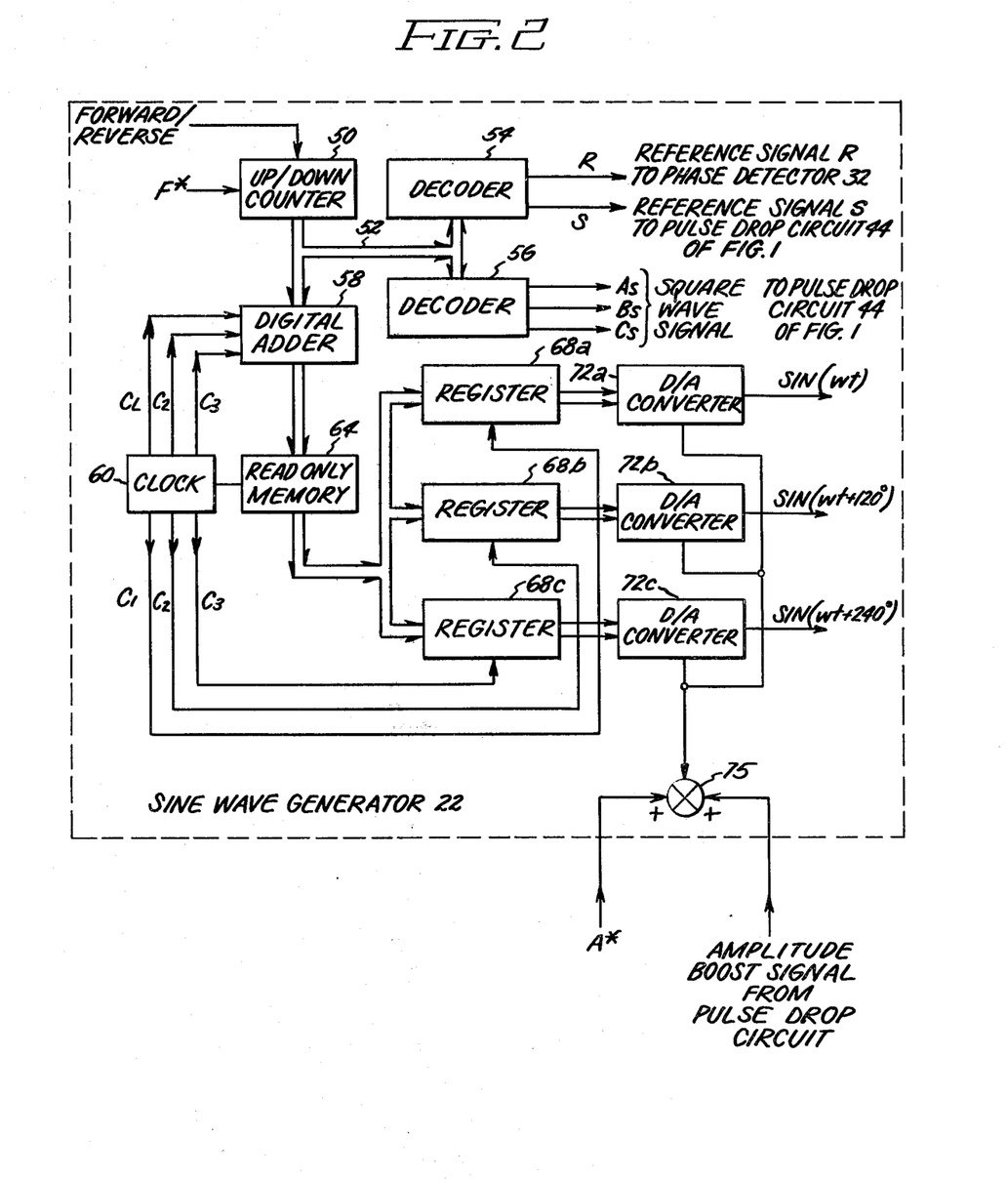
FIG. 2 is a block diagram of the first signal generator of the control apparatus of FIG. 1.

Referring now to FIG. 2, sine wave generator 22 comprises an up/down counter 50 which counts up to, or down from a counter value whose magnitude varies in accordance with the magnitude of frequency command signal F*. Whether counter 50 counts up or down from the counter value depends on whether forward or reverse machine rotation is commanded. The counter output signal, a digital word whose magnitude is representative of the phase ($\omega t$) of each of the sine wave generator output signals, is supplied via bus 52 to a separate one of decoders 54 and 56, respectively. Decoder 54 decodes the counter output signal to produce reference signals R and S, with signal R leading signal S by 90° (see FIGS. 5c & 5d) the amplitude of each reference signal changing from a first to a second level in accordance with the digital value of the counter output signal. Decoder 56 decodes the counter output signal to produce the three phase components $A_s$, $B_s$ and $C_s$ of the sine wave generator square wave output signal, each of phase components $A_s$, $B_s$ and $C_s$ changing in amplitude from a first to a second level in accordance with the digital value of the counter output signal. A digital adder is supplied from counter 50 with the counter output signal representing the expression ($\omega t$), and upon receipt of a separate one of clock signals $C_1$, $C_2$ and $C_3$ from clock 60, digital adder 58 effects a 0°, 120° and 240° digital phase shift, respectively, of the counter 50 output signal, the resultant digital adder circuit output signal being supplied to a read-only memory 64.

Read-only memory 64 contains a plurality of sinusoidal amplitude values arranged in tabular form. When read-only memory 64 is supplied from digital adder 58 with a signal which represents one of the quantities $\omega t$, $\omega t + 120°$ and $\omega t + 240°$, read-only memory 64 in response supplies an output signal proportional to one of the quantities $\sin(\omega t)$, $\sin(\omega t + 120°)$ and $\sin(\omega t + 240°)$, respectively, to a separate one of registers 68a, 68b and 68c, respectively, each register being rendered operative to accept and store an output signal from read-only memory 64 upon receipt of a separate one of clock signals $C_1$, $C_2$ and $C_3$ produced by clock 60. Clock 60 is controlled by the read-only memory 64 so that each time the read-only memory supplies a separate one of registers 68a, 68b and 68c with a sinusoidal amplitude value, clock 60 generates a separate one of clock signals $C_1$, $C_2$ and $C_3$ in sequence. This assures sequential generation of values $\omega t$, $\omega t + 120°$ and $\omega t + 240°$ by digital adder 58 and storage of the values $\sin(\omega t)$, $\sin(\omega t + 120°)$ and $\sin(\omega t + 240°)$ in a separate one of registers 68a, 68b and 68c, respectively.

Each of registers 68a, 68b and 68c, is coupled at its output to a separate one of digital-to-analog converters 72a, 72b and 72c, respectively. Each of digital-to-analog converters 72a through 72c converts the stored digital sinusoidal value contained in an associated one of registers 68a through 68c, respectively, and produces an analog sine wave output signal whose amplitude varies in accordance with the output signal magnitude of summing amplifier 75, which is supplied at its first and second noninverting inputs with the amplitude command signal A* and the amplitude boost signal from pulse drop circuit 44. Since the sine wave amplitude value stored in each of registers 68a, 68b and 68c is digitally shifted in phase by 120° from each of the other sinusoidal amplitude values stored in the other two registers, the sine wave analog output signal produced by each of D/A converters 72a through 72c, respectively, will likewise be shifted in phase from each of the other two sine wave analog signals by 120°. Sine wave generator 22 operates as follows. As counter 50 counts up to or down from a value whose magnitude varies in accordance with the magnitude of frequency command signal F*, the counter produces a count which is supplied to decoders 54 and 56. Decoder 54 decodes the count and produces reference signals R and S accordingly while decoder 56 decodes the count to produce phase components $A_s$, $B_s$ and $C_s$ of the sinewave generator square wave signal. The count of counter 50 is digitally shifted by a digital adder 58 by either 0°, 120° or 240° upon receipt by the digital adder of a separate one of clock signals $C_1$, $C_2$ and $C_3$ before being supplied to read-only memory 64, which in turn, supplies a digital sine value proportional to the digital adder output signal, to a separate one of registers 68a, 68b and 68c, respectively, each register being activated to receive a sine value from memory 64 upon receipt of a separate one of clock signals $C_1$, $C_2$ and $C_3$, respectively. The digital sine value stored in each of registers 68a through 68c, respectively, is then converted into an analog signal by a corresponding one of D/A converters 72a–72c, respectively.

Figure 3:
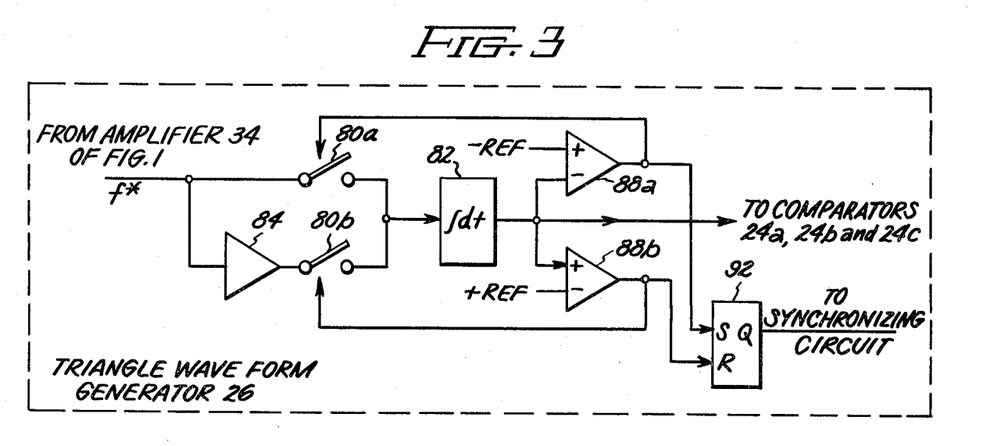
FIG. 3 is a block diagram of the triangle waveform generator of the present invention.

The details of triangle waveform generator 26 are shown in FIG. 3. Triangle waveform generator 26 comprises a pair of analog switches 80a and 80b. Switch 80a couples the output of amplifier 34 of synchronizing circuit 30 illustrated in FIG. 1 to the input of an integrator 82. Amplifier 34 is coupled through a polarity inverter 84 to the input of integrator 82 via switch 80b.

Each of analog switches 80a and 80b is controlled in accordance with the output signal magnitude of a separate one of comparators 88a and 88b, respectively. Comparator 88a is supplied at its noninverting input with a DC signal +Ref whose magnitude is proportional to the desired upper amplitude limit of the triangle waveform. The inverting input to comparator 88a is supplied with the output signal produced by integrator 82. Comparator 88b is supplied at its noninverting input with the output signal produced by integrator 82 while the inverting input of comparator 88b is supplied with a DC voltage −Ref whose magnitude is proportional to the lower amplitude limit of the triangle waveform. An R-S flip-flop 92 is coupled at the set and reset inputs to the output of a separate one of comparators 88a and 88b, respectively. As will become better understood hereinafter, R-S flip-flop 92 is set and reset in accordance with the output signal amplitude to comparators 88a and 88b, respectively, to provide an output signal representative of the phase of the triangle waveform produced by integrator 82.

The operation of triangle waveform generator 26 will now be described. Initially, the output signal amplitude of integrator 82 is zero causing comparator 88a to produce an output signal whose amplitude is at a first or logical "one level". Switch 80a closes, coupling integrator 82 to amplifier 34 illustrated in FIG. 1. In response to the DC frequency control signal f* now at its input, integrator 82 provides a rising amplitude slope signal to the inverting input of each of comparators 24a, 24b and 24c, all illustrated in FIG. 1. When the amplitude of the integrator output signal exceeds the absolute magnitude of the voltage Ref at the noninverting and inverting inputs of comparators 88a and 88b, respectively, then the output signal magnitude of comparator 88a changes from a logical "one" level to a logical "zero" level, forcing switching 80a open. Conversely, the output signal amplitude of comparator 88b changes from a logical "zero" level to a logical "one" level causing switch 80b to couple polarity inverter 84 to the input of an integrator 82. With switch 80b closed, the integrator is now supplied at its input with a DC signal of a polarity opposite that of frequency control signal f* and thus integrator 82 now provides each of comparators 24a, 24b and 24c with a falling amplitude slope signal. When the magnitude of falling amplitude slope signal exceeds the voltage Ref. at the noninverting and inverting inputs of comparators 88a and 88b, the output signal amplitude of each inverter then changes, causing switch 80a once again to close while switch 80b opens. In this manner, switches 80a and 80b are alternately conductive, causing the integrator output signal amplitude to rise and fall thereby resulting in a triangle waveform signal to the inverting input of each of comparators 24a through 24c. The changing outputs of the comparators 88a & b set and reset flip-flop 92 causing a reference feedback signal to be fed to the synchronizing circuit 30.

Turning now to FIG. 4, pulse drop circuit 44, which supplies inverter 14, illustrated in FIG. 1, with switching signals $S_1$, $S_2$ and $S_3$, comprises an analog switch 100 having three poles or contactors 100a, 100b and 100c, respectively. Each of contactors 100a, 100b or 100c of switch 100 couples the D input of a separate one of D flip-fllops 102a, 102b and 102c, respectively, between the output of a separate one of comparators 24a, 24b and 24c each illustrated in FIG. 1 and a separate one of the three square wave signal outputs of sine wave generator 22 also illustrated in FIG. 1.

A control apparatus 104, typically configured as a decoder, controls switch 100 as well as each of D-flip-flops 102a, 102b and 102c in accordance with the amplitude of signals X and Y supplied to the control apparatus from a decode circuit 108. Decode circuit 108 comprises a triplet of comparators 110a, 110b and 110c, each comparator being supplied at its inverting input with amplitude command signal A*. Each of comparators 110a, 110b and 110c is supplied at its noninverting input from a voltage source (not shown) with a separate one of preset DC voltages $V_a$, $V_b$ and $V_c$, respectively. Coupled across the noninverting input and output of each of comparators 110a, 110b, and 110c is a separate one of resistances 112a, 112b, and 112c, respectively. By supplying a portion of the comparator output signal by means of a resistor to the noninverting comparator input, each resistance introduces hysteresis to avoid instability if the comparator input hovers about the reference level.

Each of comparators 110a, 110b and 110c is coupled at its output to a decoder 114 which, in turn, supplies control circuit 104 with signals X and Y. Amplitude of signals X and Y supplied to control circuit 104 is determined by decoder 114 from the logical level of the output signal amplitude of each of comparators 110a, 110b and 110c in accordance with the relationship therebetween set forth in Table I. As can be seen from Table I, amplitude of each of signals X and Y changes from a first or logical "zero" to a second or logical "one" when the amplitude of one or more of comparators 110a through 110c changes from a first to a second logical level. In addition to producing signals X and Y, decoder 114 also produces an amplitude boost signal which is supplied to sine wave generator 22 illustrated in FIG. 1. The amplitude of the amplitude boost signal produced by decoder 114 also changes from a first to a second logical level and the output signal amplitude of one of comparators 110a through 110c changes from a first to a second logical level as indicated in Table I. As will be seen in greater detail hereinafter, during intervals when the amplitude boost signal has a second or logical "one" level, the amplitude of each of phase components A sin ($\omega t$), A sin ($\omega t + 120°$) and A sin ($\omega t + 240°$), the three phase sinewave signals produced by sine wave generator 22, is increased to compensate for pulses dropped during intervals when inverter output voltage pulses were narrower than the narrowest allowable pulses.

A counter 116 supplied from sine wave generator 22 with reference signal S, is coupled at its output to control circuit 104 and provides control circuit 104 with a count indicative of the number of polarity changes of reference signal S. When each of signals X and Y is of predetermined amplitude, control circuit 104 varies the clock signal supplied to each of D flip-flops 102a, 102b and 102c in accordance with the count of counter 116.

As will become better understood hereinafter by reference to the operation of pulse drop circuit 44, control circuit 104 by controlling the operation of D flip-flops 102a, 102b and 102c in accordance with the count of counter 116, modifies each of switching signals $S_1$, $S_2$ and $S_3$ by deleting switching signal pulses narrower than a predetermined duration during the interval uniquely defined by the count of counter 116.

Figure 5A:
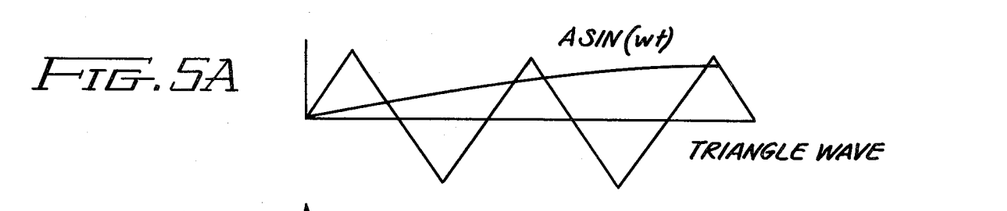
FIGS. 5A-D is a graphical illustration of the signal waveforms produced by the first and second signal generators of the control apparatus of FIG. 1.
Figures 5B, 5C:
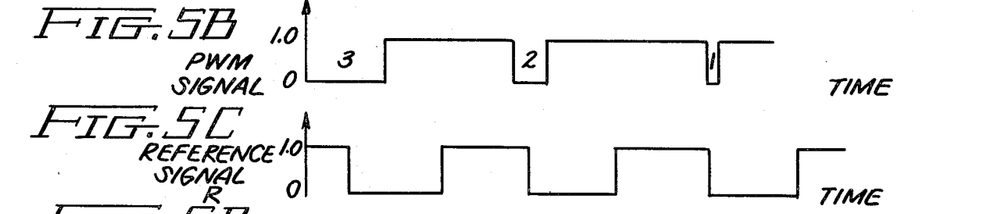
Figure 5D:
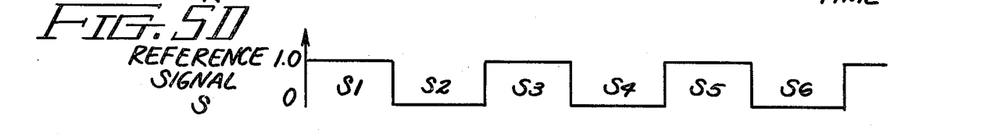

The operation of control apparatus 20 will now be set forth with respect to FIGS. 1, 4 and 5. The discussion will start with the amplitude command signal A* at a magnitude less than the magnitude of each of voltages $V_a$, $V_b$ and $V_c$ supplied to the noninverting input of a separate one of comparators 110a, 110b and 110c, respectively. In response, each of comparators 110a, 110b, and 110c provides decoder 114 with a voltage at a logical "zero" amplitude causing the decoder to supply control circuit 104 with signals X and Y, each at a logical "zero" level amplitude. Control circuit 104 supplies a clock signal to each of D flip-flops 102a, 102b and 102c and actuates switch 100 so that the D input of each flip-flop is coupled to the output of a separate one of comparators 24a, 24b and 24c, respectively, illustrated in FIG. 1.

Each of D flip-flops 102a, 102b and 102c, when "clocked", that is to say when supplied with a clock signal from control apparatus 104, supplies inverter 14 illustrated in FIG. 1 with a separate one of inverter switching signals $S_1$, $S_2$ and $S_3$, respectively, in accordance with the amplitude of the input signal at its D input. D flip-flops are typically clocked at 1 mHz. With each of D flip-flops 102a, 102b and 102c coupled at its D input to a separate one comparators 24a, 24b and 24c, respectively, each of inverter switching signals $S_1$, $S_2$ and $S_3$ varies in accordance with the difference in magnitude between the triangle waveform signal produced by triangle waveform generator 26 illustrated in FIG. 1 and a separate one of the three phase components, A sin ($\omega t$), A sin $\omega t + 120°$), and A sin ($\omega t + 240°$) produced by sine wave generator 22 illustrated in FIG. 1.

Referring to FIG. 5A which illustrates the waveform of the sine wave signal phase component and triangle waveform signal at the noninvert and inverting input of a comparator and to FIG. 5B which illustrates the output voltage waveform of the comparator, it can readily be observed that during intervals when the triangle waveform signal is of greater magnitude than the phase component of the sine wave signal, the resultant comparator output voltage is of null amplitude while during intervals when the triangle waveform signal magnitude is less than the sine wave phase component signal magnitude, then the comparator output voltage is at a logical "one" level amplitude. Those skilled in the art will recognize that during intervals when the magnitude of amplitude command signal A* is less than the magnitude of each of voltages $V_a$, $V_b$ and $V_c$, each of inverter switching signals $S_1$, $S_2$ and $S_3$ supplied to inverter 14 from pulse drop circuit 44 is produced in accordance with the equilateral triangulation technique, thereby assuring pulse width modulation operation of the inverter.

When the magnitude of amplitude command signal A* is increased responsive to operator command such that $V_a < A^* < V_b < V_c$, then control apparatus 20 causes inverter 14 to operate in the transitional pulse width modulation mode during which time inverter switching signals $S_1$, $S_2$ and $S_3$ are modified so that none of the switching signals contains a pulse narrower than a predetermined duration. This is accomplished as follows: Assuming that the magnitude of A* is such that $V_a < A^* < V_b < V_c$ then, as indicated in Table I, decoder 114 supplies control circuit 114 with signals X and Y which are a logical "zero" and a logical "one" level amplitude, respectively. Accordingly, control circuit 104 activates switch 100 so that each of D flip-flops 102a, 102b and 102c is coupled at its D input to a separate one of comparators 24a, 24b and 24c. Also, control circuit 104 supplies a clock signal to each D flip-flop in accordance with the count of counter 116 so that during predetermined intervals, no clock signals are supplied by the control circuit to each of the flip-flops to prevent transmission of a switching signal pulse to the inverter narrower than a predetermined duration.

Referring now to FIGS. 5A and 5B, it can be seen that as the amplitude of each phase component of the three phase sine wave signals increases with respect to the fixed triangle waveform amplitude, the null or logical "zero" amplitude level output voltage produced by each corresponding comparator, as represented by pulses 3, 2 and 1 in FIG. 5B becomes increasingly narrower and eventually becomes too narrow, that is to say, that the comparator output voltage pulse becomes narrower in duration than the minimum commutation time required by each inverter switching device. To avoid the undesirability of too narrow inverter switching signal pulses, control circuit 104 interrupts the clock signal supplied to each of D flip-flops 102a, 102b and 102c during the interval when the too narrow pulse would otherwise occur, as determined by the count of counter 116.

Referring to FIGS. 5B and 5C, pulse 1 will be dropped during the interval determined in accordance with the count of counter 116, which interval corresponds to interval S5 of the reference signal waveform S illustrated in FIG. 5.

When the magnitude of amplitude command signal is increased such that $V_a < V_b < A^* < V_c$, decoder 114 supplies control circuit 104 with signals X and Y to a logical "one" level and a logical "zero" level amplitude, respectively. Accordingly, control circuit 104 actuates switch 100 such that the D input of each of flip-flops 102a, 102b and 102c remains coupled to the output of a separate one of comparators 24a, 24b and 24c, respectively. Also, control circuit 104 interrupts the clock signals supplied to each of flip-flops 102a, 102b and 102c such that null amplitude pulses 1 and 2 of each comparator are deleted during a first and second predetermined intervals corresponding to intervals S3 and S5 respectively.

As indicated in Table I, when either signals X and Y is at a logical "one" level amplitude, then the amplitude boost signal supplied by the decoder to sine wave generator 22 is also at a relative "one" level amplitude. When the amplitude boost signal is a relative "one" level amplitude, then the output signal amplitude of each of the three phase components of the sinewave signal produced by sinewave generator 22 is increased. This assures that when one or more narrow inverter switching signal pulses are dropped, the length or duration of each of the remaining signals is increased to maintain the effective inverter output voltage constant.

Should the magnitude of amplitude command signal A* be increased such that it is greater than the magnitude of $V_c$, then decoder 114 supplies control circuit 104 with signals X and Y each at a logical "one" level amplitude. In response, control circuit 104 actuates switch 100 such that the D input of each of flip-flops 102a, 102b and 102c is supplied with a separate one of phase components $A_s$, $B_s$ and $C_s$, respectively, of the sine wave generator three phase square wave signal. Each of D flip-flops 102a and 102b and 102c is supplied at this time from control circuit 104 with a continuous clock signal so that each of switching signals $S_1$, $S_2$ and $S_3$ varies in accordance with a separate one of phase components $A_s$, $B_s$ and $C_s$, respectively, of the sinewave generator square wave output signal. When supplied with inverter switching signals $S_1$, $S_2$ and $S_3$ generated in accordance with square wave signal phase components $A_s$, $B_s$ and $C_s$, respectively, inverter 14 commences square wave operation.

FIG. 5 shows circuit waveforms for a ¼ of a sinewave cycle. Because of odd ¼ wave symmetry of the sinewave and symmetry of the square waves, a ¼ cycle is sufficient to illustrate the operation of the apparatus. Reference signal S has 18 sections for a full sinewave cycle for the example shown which has a triangle to sine wave frequency ratio of 9.

The foregoing describes a control apparatus for an inverter-machine drive system which implements pulse width modulation inverter operation during intervals of low frequency and square wave operation during intervals of high machine frequency. Smooth transitioning between pulse width modulation and square wave inverter operation is achieved by modifying the switching signals supplied to the inverter from the control apparatus to delete those switching signal pulses narrower than a predetermined duration.

While only certain preferred features of the invention have been shown by way of illustration, any modification and changes will occur to those skilled in the art. It is, therefore, to be understood that the appended claims are intended to cover all such modifications and changes as fall within the true spirit of the invention.

What is claimed is:

1. For use with an inverter-machine drive system including of a direct current power supply, an n phase alternating current machine and an inverter coupled between said direct current power supply and said n phase alternating current machine, said inverter configured of n pairs of serially coupled switching devices, each of said n pair of switching devices, coupled across the output of said direct current power supply and coupled at the junction between each pair of serial switching devices to a respective one of the n phases of said machine, a control apparatus for supplying said inverter with switching signals, said control apparatus comprising:

waveform generator means for generating a first waveform signal responsive to an amplitude and a frequency command and for generating a reference waveform signal synchronized with said first waveform signal having a frequency a predetermined multiple of three times the first waveform signal frequency;

first comparing means for comparing said reference waveform with said first waveform to generate pulse width modulated signals;

controllable gate means receiving said PWM signals and when not disabled connecting said PWM signals to said inverter;

means for determining which, if any, of the pulse width modulated pulses at the commanded amplitude will be narrower than a predetermined width, said means having;

second comparing means for comparing said commanded amplitude to a plurality of fixed reference values; and timing means receiving said reference signal and the output from said comparing means for disabling said controllable gate means during intervals of said reference signal when pulses narrower than a predetermined width would occur.

2. The invention of claim 1 wherein said means for determining further comprises means for generating an amplitude boost signal to increase the amplitude of said first waveform signal dependent on the number of pulses having less than a predetermined width during a predetermined fraction of a period of said first waveform.

3. For use with an inverter-machine drive system including of a direct current power supply, an n phase alternating current machine and an inverter coupled between said direct current power supply and said n phase alternating current machine, said inverter configured of n pairs of serially coupled switching devices, each of said n pairs of switching devices, coupled across the output of said direct current power supply and coupled at the junction between each pair of serial switching devices to a respective one of the n phases of said machine, a control apparatus for supplying said inverter with switching signals, said control apparatus comprising:

first waveform generator means for generating an n phase sinusoidal waveform signal responsive to an amplitude and a frequency command and for generating a first and second reference waveform signal, said first reference signal having a frequency a predetermined multiple of three times said n phase sinusoidal waveform signal frequency and said second reference waveform signal having the same frequency as said first reference waveform signal but phase shifted 90° relative thereto;

second waveform generator means for generating a triangular waveform signal in synchronism with said first reference waveform signal;

first comparing means for comparing said trangular waveform signal with each of said n phase sinusoidal waveform signals to generate n pulse width modulated signal trains;

controllable gate means receiving said PWM signals and connecting said PWM signals to said inverter when said controllable gate means are not disabled;

means for determining whether at the commanded amplitude, pulses narrower than a predetermined width will occur and identifying during which time interval measured by said second reference waveform signal said pulses less than a predetermined width will occur, said means having;

second comparing means for comparing said amplitude command to a plurality of predetermined values;

and means for receiving the output of said second comparing means and said second reference signal and providing signals to said conrollable gate means blocking pulses during intervals that have been predetermined by said second comparison means to have widths less than a predetermined value.

4. The invention of claim 3 wherein said means for determining further comprises means for generating an amplitude boost signal for increasing the amplitude of said n phase sinusoid dependent on the number of pulses having less than a predetermined width during a predetermined fraction of a period of said sinusoid.

5. The invention of claim 3 wherein said first signal generating means also generates n square waves having the same frequency and same phase displacement relative to one another as the n phase sinusoidal waveforms.

6. The invention of claim 4 further comprising means for coupling said n square waves to said inverter when all said PWM pulses are determined to be less than a predetermined width.

* * * * *